(12) United States Patent
Logan et al.

(10) Patent No.: US 10,830,263 B2
(45) Date of Patent: Nov. 10, 2020

(54) LUBRICATOR CLAMP

(71) Applicant: Stuart Petroleum Testers, LLC, The Woodlands, TX (US)

(72) Inventors: Jeremy Logan, Broussard, LA (US); Robert Wright, Houston, TX (US)

(73) Assignee: Stuart Petroleum Testers, LLC, The Woodlands, TX (US)

( * ) Notice: Subject to any disclaimer, the term of this patent is extended or adjusted under 35 U.S.C. 154(b) by 0 days.

(21) Appl. No.: 16/558,089

(22) Filed: Aug. 31, 2019

(65) Prior Publication Data

US 2020/0072260 A1 Mar. 5, 2020

Related U.S. Application Data

(60) Provisional application No. 62/724,338, filed on Aug. 31, 2018.

(51) Int. Cl.
*F16B 2/06* (2006.01)
*F16B 41/00* (2006.01)

(52) U.S. Cl.
CPC .............. *F16B 2/06* (2013.01); *F16B 41/002* (2013.01)

(58) Field of Classification Search
CPC ..... F16L 3/1075; F16L 3/1083; F16L 3/1091; F16L 3/1207
USPC .......................... 285/420, 114, 115, 116, 419
See application file for complete search history.

(56) References Cited

U.S. PATENT DOCUMENTS

| | | | |
|---|---|---|---|
| 307,648 A | 11/1884 | Holland et al. | |
| 644,393 A | 2/1900 | Albree | |
| 658,863 A | 10/1900 | Pfeffer | |
| 3,249,370 A * | 5/1966 | Brogden | F16L 55/005 285/81 |
| 3,252,192 A * | 5/1966 | Smith | F16L 1/10 269/117 |
| 3,594,023 A | 7/1971 | Yano | |
| 4,109,941 A * | 8/1978 | Wood | F16L 33/23 285/111 |

(Continued)

FOREIGN PATENT DOCUMENTS

| | | |
|---|---|---|
| CN | 205402012 U | 7/2016 |
| FR | 2658583 A1 | 8/1991 |

(Continued)

OTHER PUBLICATIONS

"1"/1.5" Clamp (tri Clover Compatible)," foxxequipment.com. Accessed: Aug. 29, 2018.

(Continued)

*Primary Examiner* — Aaron M Dunwoody
(74) *Attorney, Agent, or Firm* — Mackey Law Firm PLLC

(57) ABSTRACT

A lubricator clamp can include a first component clamp for coupling to a first piece of a lubricator on a first side of a lubricator nut, a second component clamp for coupling to a second piece of the lubricator on a second side of the lubricator nut, and a tie member coupled to the first and second component clamps. A component clamp can include a first portion having a first hinge end and a first latch end and a second portion having a second hinge end and a second latch end, wherein the first hinge end is hingeably coupled to the second hinge end and the first latch end is configured to couple with the second latch end. A tie member can include a coupler for coupling with a lubricator nut.

18 Claims, 3 Drawing Sheets

(56) References Cited

U.S. PATENT DOCUMENTS

| | | | |
|---|---|---|---|
| 4,124,231 | A | 11/1978 | Ahlstone |
| 5,100,183 | A | 3/1992 | Montesi et al. |
| 5,865,430 | A | 2/1999 | Conover et al. |
| 5,873,611 | A | 2/1999 | Munley et al. |
| 6,056,332 | A | 5/2000 | Foster |
| 6,520,710 | B2 | 2/2003 | Wells |
| 7,850,213 | B2 | 12/2010 | Gill |
| 7,883,121 | B2 | 2/2011 | Henry |
| 8,181,999 | B2 | 5/2012 | Cromarty |
| 8,196,971 | B2 | 6/2012 | Hansen |
| 8,371,623 | B2 | 2/2013 | Bronnert |
| 8,528,945 | B2 | 9/2013 | Bird et al. |
| 9,151,420 | B2 | 10/2015 | McKiernan |
| 9,163,760 | B2 | 10/2015 | Lundstrom et al. |
| 9,169,952 | B2 | 10/2015 | Horgan |
| 9,303,801 | B2 | 4/2016 | Cumic et al. |
| 9,556,989 | B2 | 1/2017 | O'Neil et al. |
| 9,915,385 | B2 | 3/2018 | Eaton et al. |
| 9,915,386 | B2 | 3/2018 | Lee |
| 2012/0025524 | A1 | 2/2012 | Krausz et al. |
| 2015/0165672 | A1* | 6/2015 | Montgomery ...... B29C 65/7802 156/272.2 |
| 2015/0174706 | A1* | 6/2015 | McClure ............ B23K 37/0533 269/45 |

FOREIGN PATENT DOCUMENTS

| | | |
|---|---|---|
| KR | 20100119465 A | 11/2010 |
| KR | 101734842 B1 | 5/2017 |
| KR | 20170054188 A | 5/2017 |
| KR | 20170082268 A | 7/2017 |
| WO | 03/091512 A1 | 6/2003 |

OTHER PUBLICATIONS

"Cushioned Pipe Clamp, Electro-Galvanized Steel, EPDM-SBR Rubber," grainger.com. Accessed Aug. 29, 2018.

"Hymax Grip—Large Diameter," krauszusa.com. Accessed Aug. 29, 2018.

"Half Aluminum Cheseboro Clamp," mutualhardware.com. Accessed: Aug. 29, 2018.

"Style 138 / Dresser Coupling / Cast & Ductile Iron Pipe," trupply.com. Accessed: Aug. 29, 2018.

* cited by examiner

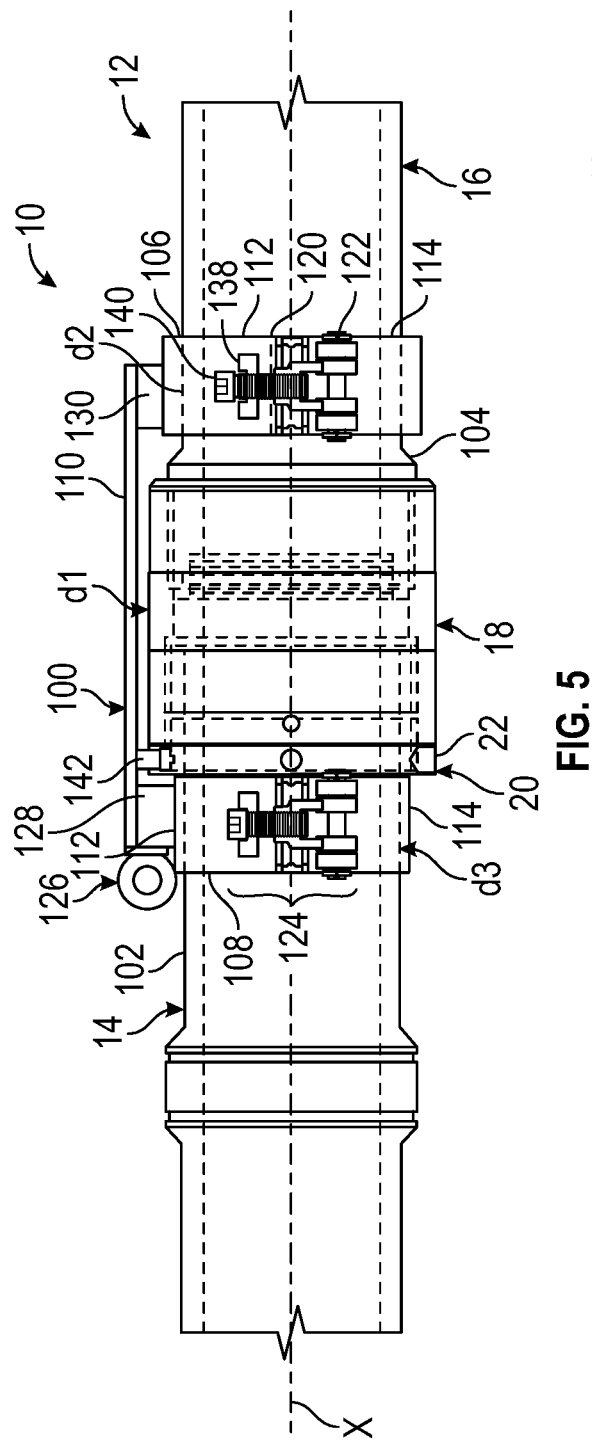
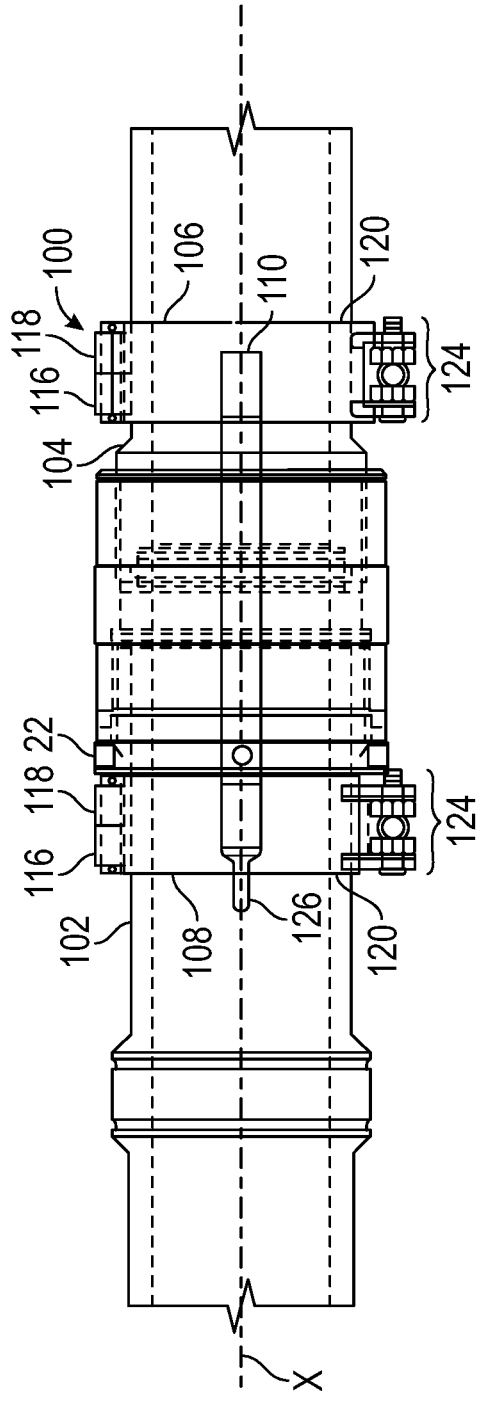

LUBRICATOR CLAMP

CROSS REFERENCE TO RELATED APPLICATIONS

This application claims the benefit of U.S. Provisional Patent Application No. 62/725,338 filed Aug. 31, 2018, the entire contents of which are hereby incorporated by reference into this application.

BACKGROUND OF THE INVENTION

1. Field of the Invention

The present disclosure relates generally to the field of oilfield equipment; and more specifically relates to a device for preventing movement, such as back off or loosening, of a lubricator nut.

2. General Background

When exploring and completing a subterranean well for the production of oil and/or gas from underground reservoirs, several types of tubulars may be placed downhole as part of the drilling, exploration and completions process. These tubulars can include casing, tubing, pipes, liners and the like, and various types of downhole tools and other devices can be moved into or out of a wellbore by or within such tubulars.

A lubricator is a device that can be used in connection with running tools into or out of a relatively high pressure wellbore, such as during drilling, workover or intervention operations. For example, a lubricator can include high-pressure pipe fitted to the top of a wellhead or Christmas tree. A lubricator may include an assembly of sections of heavy wall tubes that include integral seals and connections. The top of a lubricator assembly may include a high-pressure grease injection section and sealing elements. After installing a lubricator on top of a wellhead, any of various tools may be placed within the lubricator and the lubricator can be pressurized to the wellbore pressure. Valves on top of the wellhead may be opened to enable such tools to fall or be pumped downhole into the wellbore while maintaining wellbore pressure. Similarly, such oilfield tools may be removed by bringing the tools into the lubricator, closing the valves at the wellhead, bleeding off the pressure in the lubricator and opening the lubricator to retrieve the tools therein. In at least some types of lubricators, two or more lubricator sections or portions can be connected to one another (e.g., end to end) by way of mating male and female threaded connections at a lubricator coupling or nut section. It is important to ensure that a lubricator nut and thread connection on all lubricator components are properly connected and/or remain in their connected positions during well operations, e.g., to prevent loss of pressure or other unintended consequences.

Thus, there is a need to prevent or minimize undesired movement or loosening of lubricator components, such as due to vibration, pressure surges, bending stress caused by wind and weight transference, or other forces during well operations. The present disclosure is directed to devices, systems and methods for such purpose, including, for example, a lubricator clamp for preventing movement such as back off or loosening of a lubricator nut.

BRIEF SUMMARY OF THE INVENTION

In at least one embodiment, a lubricator clamp for a lubricator having a first piece coupled to a second piece with a lubricator nut can include a first component clamp coupled to the first piece of the lubricator on a first side of the lubricator nut, a second component clamp coupled to the second piece of the lubricator on a second side of the lubricator nut, and a tie member coupled to the first component clamp and the second component clamp. One or more component clamps can be adapted to couple to a tubular or other lubricator member or section and can include a first portion having a hinge end and a latch end and a second portion having a hinge end and a latch end. The hinge end of the first portion can be hingeably coupled to the hinge end of the second portion and the latch end of the first portion can be adapted to couple with the latch end of the second portion.

In at least one embodiment, a lubricator clamp can include one or more latches adapted to optionally couple one or more latch ends of one or more component clamps to one another. A latch can include a clevis having one or more ends, which can include a forked end and a longitudinally opposite end, a retainer, and a fastener adapted to couple with the retainer and an end or other portion of the clevis. In at least one embodiment, one end of a clevis, such as a forked or other end, can be hingeably or otherwise moveably coupled to a latch end of one of the first and second portions of a component clamp and a retainer can be coupled to a latch end of the other of the first and second portions of the component clamp.

In at least one embodiment, a lubricator clamp can include a first support block coupled to a first component clamp and a second support block coupled to a second component clamp. One or more tie members can be coupled to one or more of the support blocks, fixedly, moveably or otherwise, separately or in combination, in whole or in part. In at least one embodiment, a lubricator clamp can include one or more posts or other couplers coupled to one or more tie members, which can include one or more couplers that extend in one or more directions, such as radially inwardly from a tie member relative to a longitudinal or other axis. A post can be adapted to couple to one or more portions of a lubricator, such as a lubricator nut, split ring, or another lubricator component. For instance, in at least one embodiment, a post can be adapted for at least partial insertion into an opening in one or more of such components, such as a fastener opening or other hole, which can at least partially prevent or resist rotation or other motion of one or more components.

In at least one embodiment, a lubricator clamp can include one or more couplers, such as a tie-off ring or hole, for lifting, moving or otherwise supporting operations. A tie-off ring can be coupled to at least one of a clamp, a support block, a tie member and a combination thereof.

In at least one embodiment, a system can include one or more lubricator clamps and a lubricator that comprises two or more portions removably coupled with one another and one or more lubricator nuts. A lubricator clamp can include one component clamp configured to couple to one portion of a lubricator on one side of a lubricator nut, a second component clamp configured to couple to another portion of the lubricator on another side of the lubricator nut, and one or more tie members coupled to the first and second component clamps. In at least one embodiment, a system according to the disclosure can include one or more components of a lubricator and one or more lubricator clamps configured to couple therewith.

BRIEF DESCRIPTION OF THE SEVERAL VIEWS OF THE DRAWINGS

FIG. 5 is a side view of another of many embodiments of a system including a lubricator clamp coupled to a lubricator according to the disclosure.

FIG. 6 is another side view of the system of FIG. 5.

DETAILED DESCRIPTION OF THE INVENTION

Figure 1:
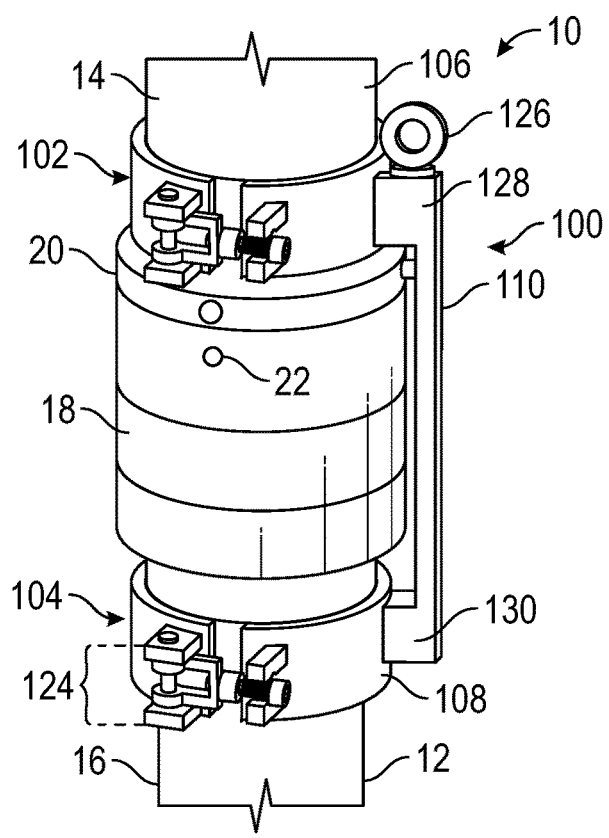
FIG. 1 is a perspective view of one of many embodiments of a system including a lubricator clamp coupled to a lubricator according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the present disclosure are necessarily described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the embodiments disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," "first," "second" and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Applicants have created devices, systems and methods for at least partially preventing movement, such as back off or loosening, of a lubricator nut and/or one or more other components of a lubricator. In at least one embodiment, which is but one of many, a lubricator clamp according to the present disclosure can include a plurality of component clamps adapted to couple to a lubricator and a tie member adapted to couple to the plurality of component clamps. A lubricator clamp according to the present disclosure can at least partially prevent undesired loosening of a lubricator nut, such as due to vibration or other forces experienced during well operations. Accordingly, a lubricator clamp according to the disclosure can at least partially reduce the occurrence of costly and time-consuming downtime.

Figure 2:
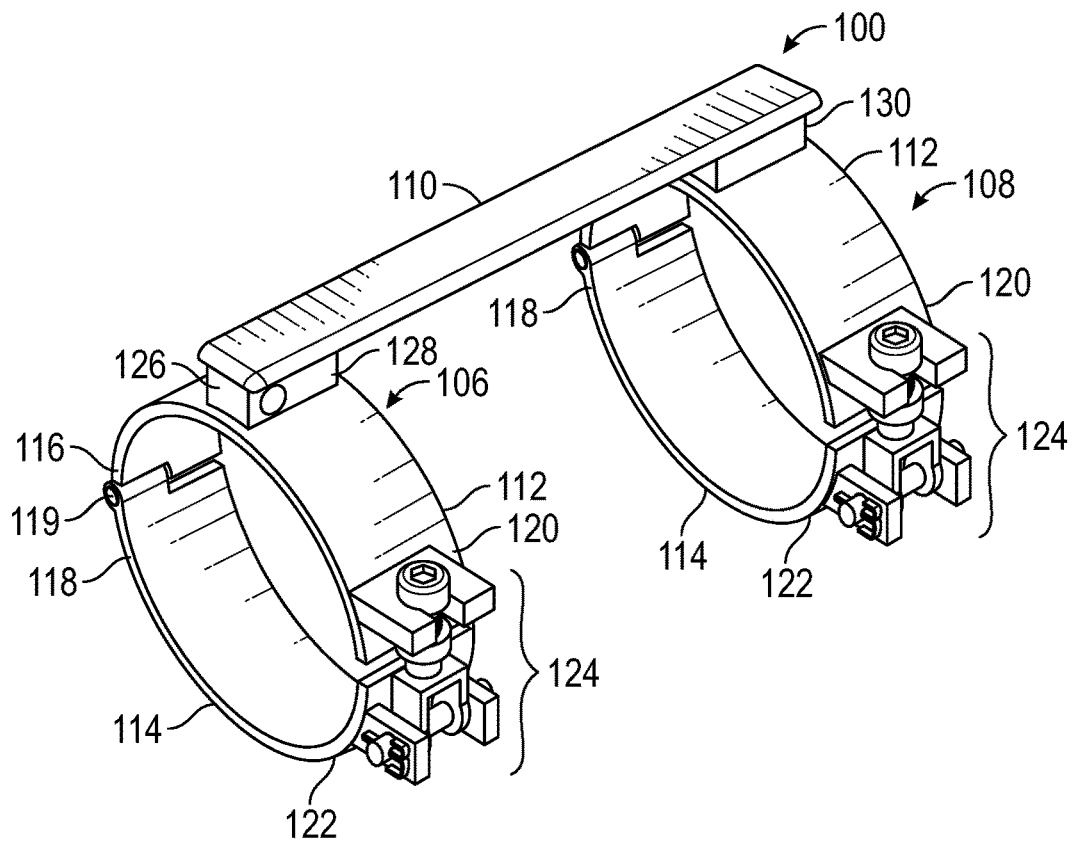
FIG. 2 is a perspective view of another of many embodiments of a lubricator clamp according to the disclosure.
Figure 3:
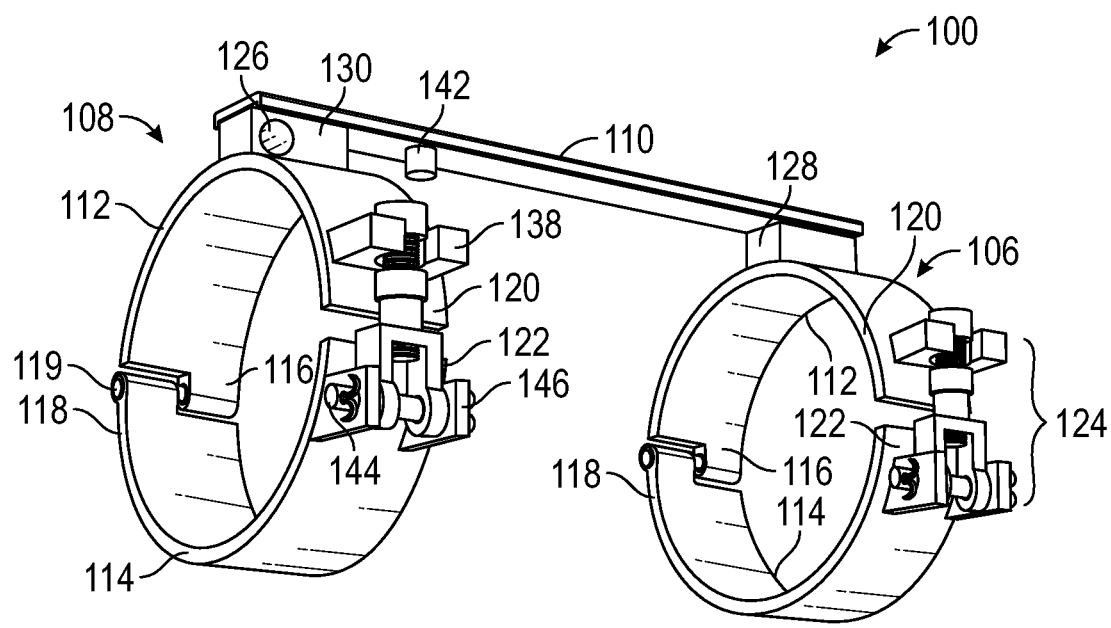
FIG. 3 is another perspective view of the lubricator clamp of FIG. 2.
Figure 4:
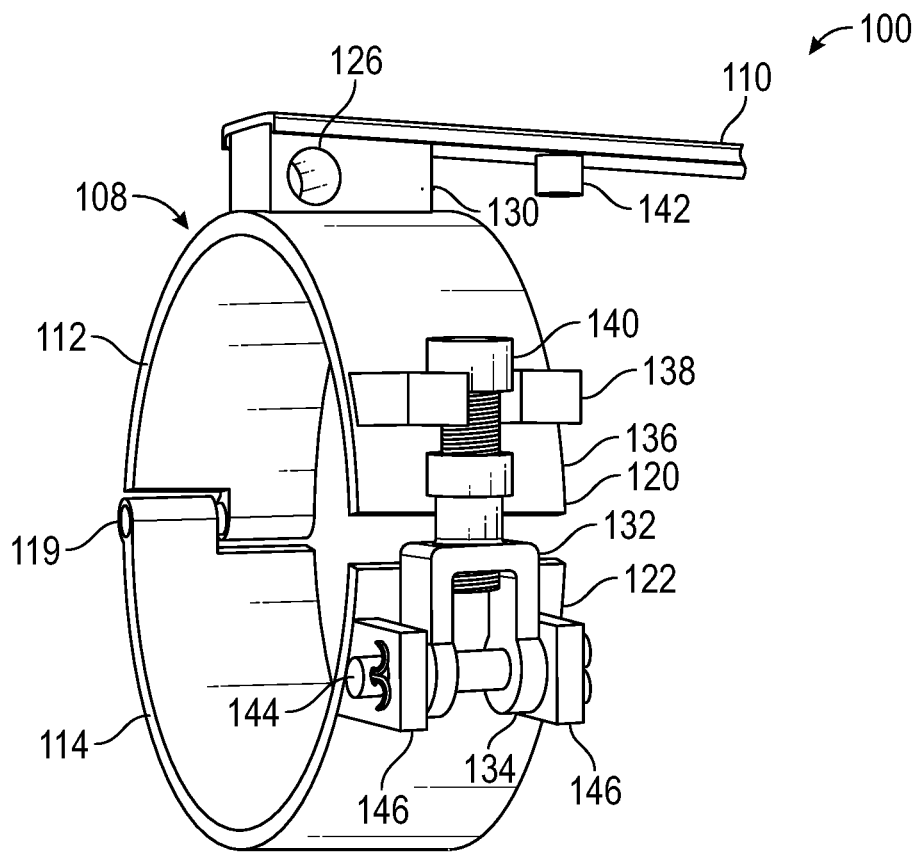
FIG. 4 is a partial perspective view of the lubricator clamp of FIG. 2.

FIG. 1 is a perspective view of one of many embodiments of a system including a lubricator clamp coupled to a lubricator according to the disclosure. FIG. 2 is a perspective view of another of many embodiments of a lubricator clamp according to the disclosure. FIG. 3 is another perspective view of the lubricator clamp of FIG. 2. FIG. 4 is a partial perspective view of the lubricator clamp of FIG. 2. FIG. 5 is a side view of another of many embodiments of a system including a lubricator clamp coupled to a lubricator according to the disclosure. FIG. 6 is another side view of the system of FIG. 5. FIGS. 1-6 will be described in conjunction with one another.

In at least one embodiment, a system 10 according to the disclosure, such as a lubricator system or a support system, can include one or more lubricators 12 and one or more lubricator clamps 100 for coupling with a lubricator or a portion thereof for at least partially resisting separation of or otherwise limiting movement of one or more components. In at least one embodiment, a lubricator 12 can include a plurality of components coupled to one another, such as a first portion or piece 14 and a second portion or piece 16 removably coupled to one another via a lubricator nut 18 (e.g., threadably). For instance, first piece 14 and second piece 16 can be tubular and can be uncoupled from one another at lubricator nut 18 from time to time during well operations for gaining access to the interior of lubricator 12 or a portion thereof. In at least one embodiment, lubricator 12 or a component thereof, such as lubricator nut 18, can include one or more rings 20, such as a split ring or other ring coupler, for coupling with lubricator nut 18 and/or one or more of first and second pieces 14, 16 for at least partially supporting operation of lubricator 12. For example, one or more rings 20 can be threadably coupled to lubricator nut 18 or coupled to first piece 14 adjacent or otherwise next to lubricator nut 18 for operably coupling first and second pieces 14, 16 to one another or for at least partially resisting movement or back off of lubricator nut 18 and/or one or more rings 20 during well operations. One or more rings 20 can, but need not, be part of a lubricator nut 18. One or more rings 20 can, but need not, comprise a plurality of segments or other portions coupled to one another to form an annular coupler. In at least one embodiment, one or more of nut 18 and ring 20 can include one or more openings 22, such as partial or thru holes, for supporting coupling and uncoupling thereof to one or more other system components. For instance, one or more openings 22 can be configured for coupling with a fastener, such as a set screw or pin (not shown) for fixing a position of nut 18 or ring 20 relative to one or more other system components. As another example, one or more openings 22 can be configured for coupling with a wrench or other tool (not shown) for rotating or otherwise moving nut 18 or ring 20 among coupled and uncoupled positions. As yet another example, one or more openings 22 can be configured for coupling with clamp 100, as further described below.

In at least one embodiment, a lubricator clamp 100 can include a plurality of component clamps configured to couple with lubricator 12 for at least partially resisting loosening of lubricator nut 18 and/or ring 20 during well operations, such as a first component clamp 106 for coupling on a first side 102 of (e.g., above) lubricator nut 18 and a second component clamp 108 for coupling on a second side 104 of (e.g., below) lubricator nut 18. While two component clamps 106, 108 are illustrated in the Figures for illustrative purposes and can be advantageous in at least some implementations of the disclosure, clamp 100 can include any number of component clamps according to an implementation of the disclosure (e.g., 2, 3, 4, 5, 6 . . . n), any two or more of which can be the same or different from one another as required or desired for an implementation at hand. For example, in at least one embodiment, two or more component clamps 106, 108 can have inside or outside diameters or other dimensions and/or cross-sectional shapes that differ from one another, such as for use with lubricators having upper and lower sections (or other portions) having different shapes and/or sizes. In other words, each component clamp 106, 108 can be shaped and sized for coupling with one or more portions of a lubricator as required or desired for an implementation at hand.

In at least one embodiment, lubricator clamp 100 can include one or more tie members 110, such as a rod, bar, arm or other structure, for coupling with component clamps 106, 108 and holding component clamps 106, 108 in one or more positions relative to one another. While one tie member 110 is illustrated in the Figures for illustrative purposes and can be advantageous in at least some implementations of the disclosure, clamp 100 can include any number of tie members 110 according to an implementation of the disclosure (e.g., 2, 3, 4, 5, 6 . . . n), any two or more of which can be the same or different from one another as required or desired for an implementation at hand. In at least one embodiment, tie member 110 can be sized and arranged for supporting coupling of one or more component clamps, such as component clamps 106, 108, with lubricator 12 and for setting or defining a distance between component clamps 106, 108 (and/or additional component clamps, if present), such as a fixed or adjustable distance in the direction of central longitudinal axis X of lubricator clamp 100 and/or lubricator 12. For example, tie member 110 can be adapted for disposing one or more component clamps 106, 108 on one side 102, 104 of lubricator nut 18 and for disposing one or more component clamps 106, 108 on the other side 102, 104 of lubricator nut 18.

Tie member 110 can, but need not, have a length, height or other dimension greater than a length, height or other dimension of lubricator nut 18 and/or ring 20, which can be or include any lengths, heights or other dimensions according to an implementation of the disclosure. One or more component clamps 106, 108 can be coupled anywhere along the length of tie member 110 according to an implementation of the disclosure and in any manner, fixedly, moveably, adjustably, or otherwise, separately or in combination, in whole or in part. For instance, in at least one embodiment, one or more component clamps 106, 108 can be coupled to tie member 110 or a component coupled to tie member 110 by welding, via one or more fasteners (e.g., screws, bolts, pins), or otherwise, separately or in combination, in whole or in part. As another example, in at least one embodiment, one or more component clamps 106, 108 can be rotatably, hingedly, and/or slideably coupled to tie member 110, which can allow for adjustability or movability of clamp 100 during use in an implementation of the disclosure and/or from one implementation to another. For instance, the distance between two or more component clamps 106, 108 can be adjustable, such as for fitting clamp 100 to one or more types, sizes or arrangements of a lubricator 12. As yet another example, one or more component clamps 106, 108 can be rotatably or hingeably coupled to tie member 110, which can allow for one clamp 106, 108 to be temporarily or otherwise disconnected from a lubricator 12 and/or moved out of the way (e.g., rotated downwardly) while another clamp 106, 108 remains coupled to the lubricator 12 for supporting clamp 100 (e.g., to keep it from falling) and/or maintaining the overall position of clamp 100 such that the disconnected clamp 106, 108 can be moved into place and/or back into place and coupled or recoupled to lubricator 12 as needed or desired during well operations. Such embodiments, which are but some of many, can be advantageous, for example, in implementations where it may be desirable to separate two or more portions of lubricator 12 without the need to completely remove lubricator clamp 100 therefrom.

In at least one embodiment, lubricator clamp 100 can include one or more support blocks 128, 130, such as spacers, inserts or other structures, and one or more component clamps 106, 108 can be coupled to tie member 110 via one or more support blocks 128, 130. One or more support blocks 128, 130 can be formed integrally with tie member 110 or formed separately and coupled thereto (e.g., by welding), separately or in combination, in whole or in part. As can be seen, for example, in FIGS. 1, 5 and 6, in at least one embodiment, a lubricator 12 can include one or more portions or components that differ in size and/or shape from one another and one or more support blocks 128, 130 can be configured for accommodating such differences, whether separately or in combination with one or more other components of clamp 100. For instance, as reflected in the illustrative embodiments of FIGS. 1, 5 and 6, which are but some of many, a lubricator nut 18 and/or ring 20, in at least one embodiment, can have an outside dimension larger than an outside dimension of one or more of first and second pieces 14, 16 of lubricator 12. In at least one embodiment, one or more support blocks 128, 130 can be sized and arranged for allowing tie member 110 to clear the exterior of lubricator nut 18 and/or ring 20 (and/or other components, if present) while one or more component clamps 106, 108 are coupled to corresponding first and second pieces 14, 16 of lubricator 12. In at least one embodiment, one or more support blocks 128, 130 can have a dimension (e.g., length, height, width, thickness) equal to or greater than the difference between an outside dimension of a lubricator piece 14, 16 or component clamp 106, 108 and an outside dimension of a lubricator nut 18 and/or ring 20, whether separately or in combination with a dimension of all or a portion of a component clamp 106, 108 or other component to which a support block 128, 130 may be coupled. The sizes and/or shapes of two or more support blocks 128, 130 can be the same or different as needed or desired according to an implementation of the disclosure. In at least one embodiment, or more support blocks 128, 130 can be sized and arranged for defining or otherwise resulting in a clearance distance d1 between a radially inside surface or other portion of tie member 110 and a radially outside surface or other portion of lubricator nut 18 and/or ring 20, which can be or include any distance according to an implementation of the disclosure. In at least one embodiment, one or more support blocks 128, 130 can be or include a hinge or other rotatable connection and a tie member 110 can rotate in one or more directions relative to one or more components clamps 106, 108.

One or more component clamps 106, 108 can be configured to couple to one or more portions or pieces of lubricator 12 or one or more other well components coupled to lubricator 12 (e.g., upstream or downstream), which can but need not be at least partially circular and/or tubular. One or more component clamps 106, 108 can include a plurality of pieces or components operably coupled with one another for clamping, such as a first portion 112 and a second portion 114 (e.g., arms, sections, members, or other clamp pieces) hingedly coupled with one another. First portion 112 and second portion 114 can be collectively sized and shaped for clamping to an exterior surface or other portion of a lubricator 12 or one or more other well components coupled to lubricator 12, which can be or include any size and shape according to an implementation of the disclosure. In at least one embodiment, one or more of component clamps 106, 108 can have a clearance d2, such as a gap or tolerance, between all or a portion of it and a corresponding lubricator 12 component, and one or more of component clamps 106, 108 can have a clearance d3, such as a gap or tolerance, between all or a portion of it and a corresponding lubricator 12 component. Clearances d2 and d3 can be or include any distance (including zero) according to an implementation of the disclosure and can be the same or different. One or more of first portion 112 and second portion 114 can have one or more ends, such as a hinge end 116, 118 and a longitudinally opposite send such as a latch end 120, 122. Hinge end 116 can be hingeably coupled to hinge end 118 (e.g., via hinge 119), and latch end 120 can be configured to couple with latch end 122. In at least one embodiment, latch ends 120, 122 can be optionally or otherwise coupled to one another by one or more latches 124 for coupling first and second portions 112, 114 of a component clamp 106, 108 to one another in a clamping fashion.

In at least one embodiment, a latch 124 can include one or more latching components removably coupled to one or more of latch ends 120, 122 of first and second portions 112, 114 of a component clamp 106, 108. In at least one embodiment, latch 124 can include one or more latch members pivotably or rotateably coupled to one of latch ends 120, 122 and adapted to be optionally coupled to the other of latch ends 120, 122 for latching and unlatching a component clamp 106, 108 in one or more positions. In at least one embodiment, which is but one of many, latch 124 can include one or more clevises 132 and one or more fasteners 140 for coupling with the one or more clevises 132. In at least one embodiment, clevis 132 can be or include a clevis-shaped member having a forked end 134 and a longitudinally opposite end 136, such as a free or other end. In at least one embodiment, clevis 132 can be or include a latch member of another shape or configuration for latching in accordance with the present disclosure (which can, but need not, include one or more forked ends), such as an arm, rod or bar. One end of clevis 132, such as forked end 134, can be rotatably coupled to one of latch ends 120, 122, such as, for example, by way of a fixed or removable pin 144 coupled to one or more latch supports 146. One end of clevis 132, such as the other end 136, can be adapted for coupling with one or more fasteners 140 and/or one or more retainers 138 coupled to another of latch ends 120, 122. For instance, fastener 140 can be or include a male or female threaded fastener (e.g., a bolt, screw or nut) and clevis 132 or a portion thereof, such as end 136, can be or include a male or female threaded fastener (e.g., a bolt, screw, nut or threaded hole) for coupling with fastener 140. In at least one embodiment, one or more retainers 138, such as a tab having a slot or other opening, for instance, can be coupled to one of latch ends 120, 122 (or another portion of a clamp portion 112, 144, if desired) and fastener 140 can be adapted for optionally coupling and uncoupling clevis 132 and retainer 138 to and from one another to latch and unlatch a component clamp 106, 108. In at least one embodiment, one or more fasteners 140 can be loosed or tightened for respectively decreasing or increasing the clamping force of a component clamp 106, 108.

In at least one embodiment, one or more component clamps 106, 108 can be coupled to a first piece 14 of lubricator 12 on one side of a lubricator nut 18 and/or ring 20 (e.g., left, above, upstream) and one or more component clamps 106, 108 can be coupled to a second piece 14 of lubricator 12 on another side (e.g., right, below, downstream) of a lubricator nut 18 and/or ring 20. The component clamps 106, 108 can be clamped to lubricator 12 near, adjacent to, next to, in contact with, and/or otherwise relative to a lubricator nut 18 and/or ring 20 for at least partially resisting rotational or other movement or back off during well operations. One or more component clamps 106, 108 can, but need not, be adapted and positioned for at least partially resting rotational movement of a lubricator nut 18 and/or ring 20 by friction, which can but need not include the presence of one or more grommets, seals, washers, elastomeric rings, or other bushings disposed between a component clamp 106, 108 and a lubricator nut 18 and/or ring 20.

In at least one embodiment, clamp 100 can include one or more couplers 142, such as a post, rod, bar, tongue or stop, for independently or collectively resisting rotational or other movement of one or more components of lubricator 12, such as lubricator nut 18 and/or ring 20. For example, one or more posts or other couplers 142 can be coupled to tie member 110 (and/or other components of clamp 100) and can extend, for instance, radially inwardly from tie member 110 (e.g., relative to longitudinal axis X or another axis) for coupling with or otherwise cooperating with lubricator 12 or a component thereof. In at least one embodiment, coupler 142 can be or include one or more fixed or adjustable posts sized and positioned for being disposed at least partially within one or more openings 22 in a lubricator nut 18 and/or ring 20 for at least partially resting or preventing rotational, axial or other movement thereof when clamp 100 is coupled to lubricator 12, such as in a fully coupled or engaged position. In at least one embodiment, one or more couplers 142 can be of a fixed size and/or position, such as by way of being a post welded in place according to an implementation of the disclosure. In at least one embodiment, one or more couplers 142 can be adjustable in one or more manners. For instance, one or more couplers 142 can be or include one or more threaded or other fasteners and the location of one or more ends of such coupler(s) can be adjusted by, e.g., turning the fastener relative to a threaded opening in tie member 110 or another portion of clamp 100. As another example, in at least one embodiment, one or more couplers 142 can be adjustably disposed and couplable to one or more slots or other openings in or through tie member 110 or another portion of clamp 100 and can be adjusted in an axial, radial, or other direction relative to lubricator 12 or a portion thereof, such as one or more openings 22, as needed or desired for an implementation of the disclosure at hand.

In at least one embodiment, one or more couplers 142 can be or include a post adapted to couple to one or more portions of a lubricator, such as a split ring, or another lubricator component. Each of the component clamps 106 and 108 can include a first portion 112 having a hinge end 116 and a latch end 120 and a second portion 114 having a hinge end 118 and a latch end 122. Latch ends 120 and 122 can be coupled by a latch 124. Latch 124 can include a clevis 132 having a forked end 134 and a longitudinally opposite end 136. A fastener 140 can be adapted to couple with a retainer 138 and the clevis 132. A component clamp 106, 108 can include any number of latches 124 according to an implementation of the disclosure. In at least one embodiment, a latch 124 can include a clevis 132 having a forked or other end 134 and a longitudinally opposite end 136. One end of the clevis, such as a forked end 134 or other end, can be hingeably or otherwise moveably coupled to the latch end 122 of the second portion 114 of the component clamp 106 and a retainer 138 can be coupled to the latch end 120 of the first portion 112 of the component clamp 106 (or vice versa, or both). One or more fasteners 140 can be adapted to couple with a retainer 138 and a clevis 132 or portion thereof, such as free end 136.

In at least one embodiment, lubricator clamp 100 can include one or more couplers 126, such as a tie-off ring, loop, hole, opening or other connector, for lifting, securing, moving or otherwise supporting lubricator clamp 100 or a portion thereof during well operations. In at least one embodiment, one or more tie-off rings or other couplers 126 can be coupled to at least one of a component clamp, a support block, a tie member and a combination thereof. In at least one embodiment, one or more tie-off rings or other couplers 126 can be or include one or more openings or thru holes disposed in or through at least one of a component clamp, a support block, a tie member and a combination thereof. One or more couplers 126 can enable the connection of clamp 100 to a cable, wire or other line for securing clamp 100 to a platform, derrick or other structure (e.g., for safety reasons), for moving or positioning clamp 100 (e.g., via winch or crane line), or otherwise, including when clamp 100 is at least partially coupled to a lubricator 12, is completely uncoupled from a lubricator 12, or both. Clamp 100 and its components can be made from any material or materials according to an implementation of the disclosure, separately or in combination, in whole or in part. For example, some or all of clamp 100 can be made from metal, such as steel, stainless steel, steel alloys, aluminum, etc.

In at least one embodiment, a lubricator clamp for a lubricator having a first piece threadably coupled to a second piece with a lubricator nut can include a first clamp coupled to the first piece of the lubricator on a first side of the lubricator nut, a second clamp coupled to the second piece of the lubricator on a second side of the lubricator nut, and a tie member coupled to the first clamp and the second clamp. One or more clamps can be adapted to couple to a tubular and can include a first portion having a hinge end and a latch end and a second portion having a hinge end and a latch end, wherein the hinge end of the first portion can be hingeably coupled to the hinge end of the second portion, and wherein the latch end of the first portion can be adapted to couple with the latch end of the second portion.

In at least one embodiment, a lubricator clamp can include a latch adapted to optionally couple one or more latch ends to one another. A latch can include a clevis having one or more ends, which can include a forked end and a longitudinally opposite free end, a retainer, and a fastener adapted to couple with the retainer and the free end of the clevis. In at least one embodiment, one end of the clevis, such as a forked or other end, can be hingeably or otherwise moveably coupled to the latch end of one of the first and second portions of the clamp and the retainer can be coupled to the latch end of the other of the first and second portions of the clamp.

In at least one embodiment, a lubricator clamp can include a first support block coupled to the first clamp and a second support block coupled to the second clamp, and the tie member can be coupled to one or more of the support blocks, fixedly, moveably or otherwise, separately or in combination, in whole or in part. In at least one embodiment, a lubricator clamp can include a post or other coupler coupled to the tie member, which can include a coupler that extends one or more directions, such as radially inwardly from the tie member relative to a longitudinal or other axis. The post can be adapted to couple to one or more portions of a lubricator, such as a lubricator nut, split ring, or another lubricator component. For instance, in at least one embodiment, a post can be adapted for at least partial insertion into an opening in one or more or such components, such as a fastener opening or other hole, which can at least partially prevent rotation or other motion of one or more components. In at least one embodiment, a lubricator clamp can include one or more couplers, such as a tie-off ring, for lifting, moving or otherwise supporting operations. A tie-off ring can be coupled to at least one of a clamp, a support block, a tie member and a combination thereof.

In at least one embodiment, a lubricator can include a first lubricator section coupled to a second lubricator section via a lubricator nut and a lubricator clamp can include a first component clamp configured to couple to the first section and a second component clamp configured to couple to the second section. In at least one embodiment, a lubricator clamp can include three or more component clamps configured to couple to corresponding sections or portions of a lubricator or well components coupled to a lubricator. A lubricator clamp can include one or more tie members coupled to one or more component clamps.

In at least one embodiment, each of the component clamps can be adapted to couple to a tubular or other structure and each component clamp can include a first portion having a hinge end and a latch end and a second portion having a hinge end and a latch end. The hinge end of the first portion can be hingeably coupled to the hinge end of the second portion with a hinge, hinge pin or other hinge connection and the latch end of the first portion can be adapted to couple with the latch end of the second portion. A lubricator clamp can include one or more latches adapted to optionally couple the latch ends of the first and second portions of one or more component clamp portions to one another. In at least one embodiment, a latch can include a clevis and one or more fasteners adapted for coupling with the clevis. In at least one embodiment, one end of a clevis, such as a forked or other end, can be hingeably or otherwise moveably coupled to the latch end of one of the first and second portions of a component clamp. One or more retainers can be coupled to the latch end of the other of the first and second portions of the component clamp. In at least one embodiment, a latch end can include one or more hinged connections to a clevis and one or more retainers for coupling with another clevis or a fastener coupled to such other clevis.

In at least one embodiment, a lubricator clamp can include one or more blocks, such as support blocks, coupled to one or more component clamps and one or more tie members, fixedly, moveably or otherwise, separately or in combination, in whole or in part. In at least one embodiment, a lubricator clamp can include one or more posts or other couplers coupled to one or more tie members, which can include one or more couplers that extend in one or more directions (which can be the same or different), such as radially inwardly from the tie member or otherwise relative to a longitudinal or other axis. One or more posts can be adapted to couple to one or more portions of a lubricator, such as a lubricator nut, split ring, or another lubricator component. For instance, in at least one embodiment, the post can be adapted for at least partial insertion into an opening in one or more of such lubricator components, such as a fastener opening or other hole, which can at least partially prevent or limit rotation or other motion of one or more of such lubricator components. In at least one embodiment, a lubricator clamp can include one or more couplers, such as a tie-off ring, for lifting, moving or otherwise supporting use of the lubricator clamp during well operations. One or more tie-off rings can be coupled to at least one of a component clamp, a support block, a tie member and a combination thereof.

In at least one embodiment, a lubricator clamp can include a first component clamp configured to couple to a first piece of a lubricator on a first side of a lubricator nut, a second component clamp configured to couple to a second piece of the lubricator on a second side of the lubricator nut, one or more tie members coupled to the first and second component clamps, and at least one coupler coupled to the tie member and extending radially inwardly toward a central longitudinal axis of the lubricator clamp. The at least one coupler can be configured to at least partially resist movement of the lubricator nut in one or more directions, such as rotationally, longitudinally or both. The at least one coupler can be configured to be disposed at least partially within an opening in the lubricator nut or as portion thereof, such as a ring or split ring, for at least partially resisting rotational and/or axial movement of the lubricator nut. At least one of the one or more tie members can be offset radially outwardly relative to an outside dimension of at least one of the first and second component clamps, such as for clearing components having outside dimensions greater than one or more other components.

In at least one embodiment, one or more component clamps can include first and second portions having hinge ends hingeably coupled to one another and latch ends configured to be coupled to one another with one or more latches or latch portions. In at least one embodiment, a latch can be configured to removably couple the latch end of the first portion and the latch end of the second portion to one another. In at least one embodiment, a latch can include a clevis or other latch member hingeably coupled to the latch end of one of the first and second portions and a fastener or other latch member configured to couple to at least one of the clevis, the latch end of the other of the first and second portions, a latch component or other component coupled to the clevis, and a combination thereof.

In at least one embodiment, a lubricator clamp for a lubricator having a lubricator nut can include a first component clamp configured to couple to a first piece of the lubricator on a first side of the lubricator nut, a second component clamp configured to couple to a second piece of the lubricator on a second side of the lubricator nut, a first support block coupled to a radially exterior surface of the first component clamp and a second support block coupled to a radially exterior surface of the second component clamp, a tie member coupled to the first and second support blocks, and a post coupled to the tie member and extending radially inwardly relative to a central longitudinal axis of the lubricator clamp. One or more component clamps can include a first portion having a first hinge end and a first latch end and a second portion having a second hinge end and a second latch end. The first hinge end can be hingeably coupled to the second hinge end. The first latch end can be configured to couple with the second latch end. A latch can include a first latch portion rotatably coupled to one of the first and second latch ends and a second latch portion configured to couple to both the first latch portion and the other of the first and second latch ends.

Other and further embodiments utilizing one or more aspects of the inventions described above can be devised without departing from the spirit of Applicant's disclosure. For example, while clamp 100 has been described with reference to a lubricator for illustrative purposes, one or more embodiments of clamp 100 can be adapted for use with other oilfield equipment having two tubular portions removably coupled with one another in an end-to-end fashion by a nut or similar coupler susceptible to loosening during well operations. Further, the various embodiments of the present disclosure can be included in combination with each other to produce variations of the disclosed embodiments. Discussion of singular elements can include plural elements and vice-versa. The various steps described herein can be combined with other steps, interlineated with the stated steps, and/or split into multiple steps. Similarly, elements have been described functionally and can be embodied as separate components or can be combined into components having multiple functions.

The present inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A lubricator clamp for a lubricator having a first piece coupled to a second piece with a lubricator nut, the lubricator clamp comprising:
    a first component clamp configured to couple to the first piece of the lubricator on a first side of the lubricator nut;
    a second component clamp configured to couple to the second piece of the lubricator on a second side of the lubricator nut;
    a tie member coupled to the first and second component clamps; and
    a coupler coupled to the tie member in a location longitudinally between two ends of the tie member, wherein the coupler extends radially inwardly from the tie member toward a longitudinal axis of the lubricator clamp;
    wherein the coupler is configured to couple with at least one of a split ring, the lubricator nut and a combination thereof to at least partially resist back off of the lubricator nut during well operations.

2. The lubricator clamp of claim 1, wherein each of the first and second component clamps is configured to couple to a tubular, and wherein each of the first and second component clamps further comprises
    a first portion having a first hinge end and a first latch end; and
    a second portion having a second hinge end and a second latch end;
    wherein the first hinge end is hingeably coupled to the second hinge end, and the first latch end is configured to couple with the second latch end.

3. The lubricator clamp of claim 2, further comprising a latch coupled to one of the first and second component clamps and configured to optionally couple the first and second latch ends thereof to one another, wherein the latch comprises
a clevis having a forked end and a longitudinally opposite free end;
a retainer; and
a fastener configured to couple with the retainer and the free end of the clevis;
wherein the forked end of the clevis is hingeably coupled to the latch end of one of the first and second portions of the component clamp and the retainer is coupled to the latch end of the other of the first and second portions of the component clamp.

4. The lubricator clamp of claim 1, further comprising a first support block coupled to the first component clamp and a second support block coupled to the second component clamp, wherein the tie member is coupled to the support blocks.

5. The lubricator clamp of claim 4, wherein the first and second support blocks are configured to offset the tie member radially outwardly relative to the longitudinal axis of the lubricator clamp.

6. The lubricator clamp of claim 4, wherein the coupler comprises a post.

7. The lubricator clamp of claim 6, wherein the post is configured to couple with the split ring.

8. The lubricator clamp of claim 6, wherein the post is configured to be disposed at least partially within an opening on an exterior surface of at least one of the split ring, the lubricator nut and a combination thereof.

9. The lubricator clamp of claim 1, further comprising a tie-off ring coupled to at least one of the first and second component clamps.

10. The lubricator clamp of claim 4, further comprising a tie-off ring coupled to at least one of the first support block, the second support block, the tie member and a combination thereof.

11. The lubricator clamp of claim 4, wherein at least one of the first and second support blocks comprises an opening therein or therethrough.

12. The lubricator clamp of claim 1, wherein the first and second sides of the lubricator nut are longitudinally opposite one another.

13. The lubricator clamp of claim 1, wherein at least one of the first and second component clamps is configured to at least partially resist movement of the lubricator nut in one or more directions.

14. A lubricator clamp, comprising:
a first component clamp configured to couple to a first piece of a lubricator on a first side of a lubricator nut;
a second component clamp configured to couple to a second piece of the lubricator on a second side of the lubricator nut;
one or more tie members coupled to the first and second component clamps; and
at least one coupler coupled to the tie member and extending radially inwardly toward a central longitudinal axis of the lubricator clamp;
wherein the at least one coupler is configured to at least partially resist movement of the lubricator nut in one or more directions.

15. The lubricator clamp of claim 14, wherein the at least one coupler is configured to be disposed at least partially within an opening in the lubricator nut for at least partially resisting rotational and/or axial movement of the lubricator nut.

16. The lubricator clamp of claim 14, wherein at least one of the one or more tie members is offset radially outwardly relative to an outside dimension of at least one of the first and second component clamps.

17. The lubricator clamp of claim 14, wherein each of the first and second component clamps comprises
first and second portions having hinge ends hingeably coupled to one another and latch ends configured to be coupled to one another with a latch; and
a latch configured to removably couple the latch end of the first portion and the latch end of the second portion to one another;
wherein the latch comprises
a clevis hingeably coupled to the latch end of one of the first and second portions; and
a fastener configured to couple to both the clevis and the latch end of the other of the first and second portions.

18. A lubricator clamp for a lubricator having a lubricator nut, the lubricator clamp comprising:
a first component clamp configured to couple to a first piece of the lubricator on a first side of the lubricator nut;
a second component clamp configured to couple to a second piece of the lubricator on a second side of the lubricator nut;
a first support block coupled to a radially exterior surface of the first component clamp and a second support block coupled to a radially exterior surface of the second component clamp;
a tie member coupled to the first and second support blocks; and
a post coupled to the tie member and extending radially inwardly relative to a central longitudinal axis of the lubricator clamp;
wherein each of the first and second component clamps comprises
a first portion having a first hinge end and a first latch end;
a second portion having a second hinge end and a second latch end, wherein the first hinge end is hingeably coupled to the second hinge end and the first latch end is configured to couple with the second latch end; and
a latch having a first latch portion rotatably coupled to one of the first and second latch ends and a second latch portion configured to couple to both the first latch portion and the other of the first and second latch ends.

* * * * *